(No Model.)
E. E. LARKINS.
KITCHEN UTENSIL.
No. 458,175. Patented Aug. 25, 1891.
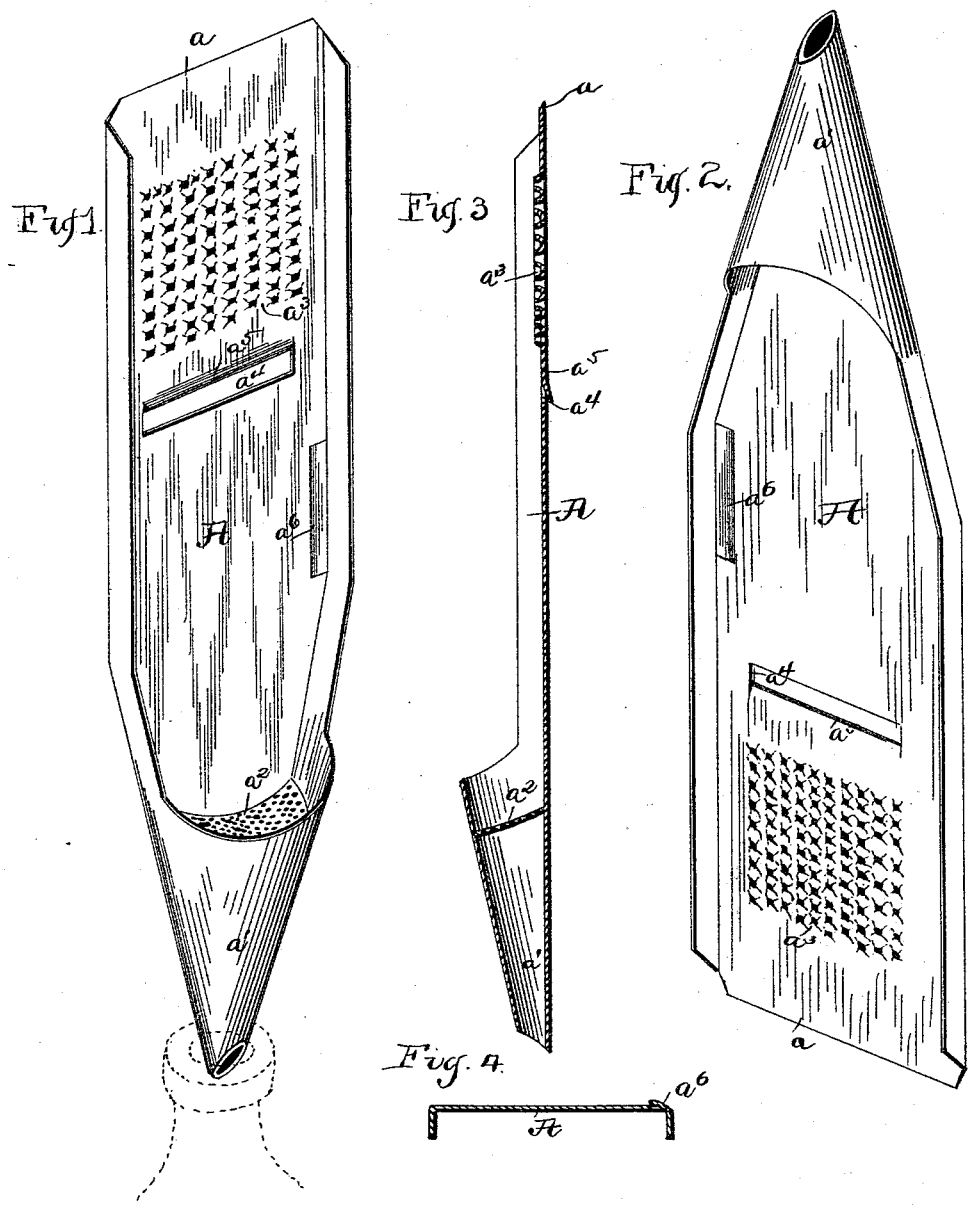
Witnesses
H. G. Seitz
J. Edgar Smith
Inventor
Emmet E. Larkins,
By his Attorneys,
C. A. Snow & Co.
THE NORRIS PETERS CO., PHOTO-LITHO., WASHINGTON, D. C.

UNITED STATES PATENT OFFICE.

EMMET ERSKIN LARKINS, OF RUSSELLVILLE, KENTUCKY.

KITCHEN UTENSIL.

SPECIFICATION forming part of Letters Patent No. 458,175, dated August 25, 1891.

Application filed December 10, 1890. Serial No. 374,217. (No model.)

*To all whom it may concern:*

Be it known that I, EMMET ERSKIN LARKINS, a citizen of the United States, residing at Russellville, in the county of Logan and State of Kentucky, have invented a new and useful Kitchen Utensil, of which the following is a specification.

This invention is an improvement in kitchen utensils, and has for its objects to provide a kitchen utensil which will combine within itself devices for taking out the eyes of potatoes, for decanting liquids, for straining liquids, for peeling vegetables, for slicing vegetables, for grating cocoanuts, chocolate, nutmegs, and the like, and also for chopping meats, cabbage, and other articles.

The object is, furthermore, to provide a kitchen utensil which, while combining the usefulness of several articles, may be sold at the price of one of said articles, and which will be durable in use, handy and efficient.

With these objects in view the invention resides in the various novel details of construction and in the combination of parts, hereinafter fully described, and particularly pointed out in the claim.

In the drawings in which I have illustrated my invention, and in which like letters of reference indicate corresponding parts, Figure 1 is a perspective view showing my kitchen utensil used as a funnel. Fig. 2 is a similar view showing the same used as a chopper. Fig. 3 is a longitudinal sectional view of the same, and Fig. 4 is a transverse sectional view of the same.

In the drawings, the letter A designates the utensil, which has upon one end a cutting-edge $a$ and upon the other end a funnel $a'$, which is provided near its upper opening with a perforated or reticulated diaphragm $a^2$. The small end of the funnel is cut at an angle, in order that it may provide means for removing the cores of apples, the eyes of potatoes, and other undesirable parts of vegetables. The body of the utensil is formed at $a^3$ into a nutmeg-grater, as shown, and near this is provided with a slot $a^4$, one of the longitudinal walls of which is bent slightly outward to form a knife or slicer $a^5$. A peeler $a^6$ is provided near one of its edges by slitting the body of the utensil and depressing one of the sides of the slit, as shown.

It will be seen that my utensil is of great help to the housekeeper, as it provides a handy and useful combination of articles, which if they were separated might necessitate a protracted search for them when most needed. To enumerate, liquids may be decanted through the funnel $a'$, the said liquids being separated from any coarse materials suspended in them by the strainer or perforated diaphragm $a^2$, and the small end of the funnel being of such size that it will readily fit the ordinary bottle-neck. Further, the cutting-edge $a$ may be used to hash beef, chop slaw, slice tomatoes, and perform the like operations. Further, potatoes may be peeled by the peeler $a^6$, and afterward sliced by means of the slicer $a^5$, or they may be boiled and afterward pressed through the grater portion $a^3$, to mash them completely. Further, the grater portion may be used to grate nutmegs, cocoanuts, chocolate, and the like.

I may make my utensil of any convenient, useful, or appropriate substance; but I prefer at present to construct it of the best tinned steel, and I also prefer to form the same of one piece of metal stamped to the proper shape, although, without departing from the spirit of my invention, the device may be made in several sections and joined together to form the utensil substantially as above set forth.

Having thus described my invention, what I claim as new, and desire to secure by Letters Patent, is—

A kitchen utensil having a straight body provided with flanged edges having at one end and formed integral therewith a funnel $a'$, the lower end of which is cut at an angle to serve as a means for removing the eyes from potatoes, the screen $a^2$ at the top of the funnel, the flanges of the body at the other end being removed and said end being sharpened to serve as a chopper, the grating-surface formed in the body below the chopper, the slot $a^4$ cut in the body and having the metal turned outwardly to serve as a slicer, and a vertical slot cut in the body at one side, with the metal turned out and sharpened to act as a peeler, substantially as and for the purpose set forth.

In testimony that I claim the foregoing as my own I have hereto affixed my signature in presence of two witnesses.

EMMET ERSKIN LARKINS.

Witnesses:
M. B. PERRY,
C. W. COURTS.